US012182755B2

(12) United States Patent
Jurich, Jr. et al.

(10) Patent No.: US 12,182,755 B2
(45) Date of Patent: Dec. 31, 2024

(54) DETERMINING ITEM MORTALITY BASED ON TRACKED ENVIRONMENTAL CONDITIONS DURING TRANSIT

(71) Applicant: Walmart Apollo, LLC, Bentonville, AR (US)

(72) Inventors: Joseph Jurich, Jr., Molino, FL (US); David Justin Schuhardt, Montara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/330,078

(22) Filed: Jun. 6, 2023

(65) Prior Publication Data

US 2023/0316216 A1    Oct. 5, 2023

Related U.S. Application Data

(63) Continuation of application No. 16/507,579, filed on Jul. 10, 2019, now abandoned.
(Continued)

(51) Int. Cl.
*G06Q 10/0832* (2023.01)
*G06N 3/08* (2023.01)
(Continued)

(52) U.S. Cl.
CPC .......... *G06Q 10/0832* (2013.01); *G06N 3/08* (2013.01); *G06Q 10/0833* (2013.01);
(Continued)

(58) Field of Classification Search
CPC .......... G06Q 10/0832; G06Q 10/0833; G06Q 10/08355; G06Q 30/0206; G06N 3/08; G06N 5/04; B65D 88/00; H04W 4/38
(Continued)

(56) References Cited

U.S. PATENT DOCUMENTS 5,648,763 A * 7/1997 Long ............... G08B 13/22
340/8.1
6,775,624 B2    8/2004 Storino
(Continued)

FOREIGN PATENT DOCUMENTS

WO    2017178902 A1    10/2017
WO    2017196821 A1    11/2017

OTHER PUBLICATIONS

Hardesty, Larry "Explained: Neural networks" <https://news.mit.edu/2017/explained-neural-networks-deep-learning-0414#:~:text=Neural%20nets%20are%20a%20means,been%20hand%2Dlabeled%20in%20advance>, Apr. 14, 2017, MIT News Office. (Year: 2017).*
(Continued)

*Primary Examiner* — Jeff Zimmerman
*Assistant Examiner* — Brian A Tallman
(74) *Attorney, Agent, or Firm* — Foley IP Law, PLLC

(57) ABSTRACT

Item mortality, such as failure rates and expected remaining lifespan, may be determined based on tracked environmental conditions during transit, such as vibration, temperature, and other conditions. For complex items, multiple different internal components may have varying degrees of susceptibility to damage from unfavorable conditions, with each of the components able to individually cause a failure of the entire item. Thus, the specific set of internal components may drive item mortality prediction. Sensors may be located in shipping containers that share data collected throughout the supply chain, using a blockchain, to increase confidence in the integrity of the data. The use of mortality models generated with anonymized component or process data may enable manufacturers to protect trade secrets, such as the specific components or manufacturing processes used, even while leveraging the manufacturer's detailed knowledge of an item.

20 Claims, 7 Drawing Sheets

Related U.S. Application Data

(60) Provisional application No. 62/714,323, filed on Aug. 3, 2018.

(51) Int. Cl.
  *G06Q 10/0833* (2023.01)
  *G06Q 10/0835* (2023.01)
  *G06Q 30/0201* (2023.01)
  *B65D 88/00* (2006.01)
  *H04W 4/38* (2018.01)

(52) U.S. Cl.
  CPC ... *G06Q 10/08355* (2013.01); *G06Q 30/0206* (2013.01); *B65D 88/00* (2013.01); *H04W 4/38* (2018.02)

(58) Field of Classification Search
  USPC ......................................................... 705/332
  See application file for complete search history.

(56) References Cited

U.S. PATENT DOCUMENTS

| | | | |
|---|---|---|---|
| 7,391,321 B2 * | 6/2008 | Twitchell, Jr. | B65D 90/00 340/8.1 |
| 7,392,150 B2 | 6/2008 | Kuepper et al. | |
| 7,639,134 B2 | 12/2009 | Lambright et al. | |
| 8,258,950 B2 | 9/2012 | Rajapakse et al. | |
| 8,284,049 B2 * | 10/2012 | Blanchard | G08B 25/10 340/691.7 |
| 9,294,283 B2 | 3/2016 | Oertli | |
| 2007/0200701 A1 | 8/2007 | English et al. | |
| 2009/0312999 A1 * | 12/2009 | Kasztenny | G05B 23/0283 703/13 |
| 2010/0332407 A1 | 12/2010 | Grieve et al. | |
| 2011/0068954 A1 | 3/2011 | McQuade et al. | |
| 2013/0289927 A1 | 10/2013 | Smith et al. | |
| 2015/0046361 A1 | 2/2015 | Williams et al. | |
| 2015/0071757 A1 | 3/2015 | Daczko et al. | |
| 2015/0106780 A1 | 4/2015 | Bickford et al. | |
| 2015/0301521 A1 * | 10/2015 | Byron | G05B 19/4183 700/108 |
| 2016/0196527 A1 * | 7/2016 | Bose | G06Q 10/0832 705/332 |
| 2017/0278061 A1 * | 9/2017 | Skaaksrud | G06Q 10/087 |
| 2017/0345247 A1 | 11/2017 | Torresani et al. | |
| 2018/0046869 A1 * | 2/2018 | Cordell | G01S 19/485 |
| 2018/0096175 A1 * | 4/2018 | Schmeling | G06F 1/3206 |
| 2018/0130158 A1 | 5/2018 | Atkinson et al. | |
| 2019/0114714 A1 * | 4/2019 | Jones | G06Q 10/083 |

OTHER PUBLICATIONS

Alam et al., "Lifetime Estimation Using Only Failure Information From Warranty Database", Dec. 2009, IEEE Transactions on Reliability, vol. 58, No. 4, pp. 573-582. (Year: 2009).*

Sikorska et al., "Prognostic modeling options for remaining useful life estimation by industry", 2011, Mechanical Systems and signal Processing 25, p. 1803-1836. (Year: 2011).*

Elwany et al. ("Real-time Estimation of Mean Remaining Life Using Sensor-Based Degradation Models", Journal of Manufacturing Science and Engineering, Oct. 2009) (Year: 2009).*

Uknown, "When Blockchain Meets IoT and the Food and Pharmaceutical Cold Chains," Controlant, Mar. 23, 2018, 11 pages.

Young, Lee W., "International Search Report", International Application No. PCT/US2019/041158, mailed Oct. 8, 2019, 2 pages.

Young, Lee W., "Written Opinion", International Application No. PCT/US2019/041158, mailed Oct. 8, 2019, 5 pages.

Sikorska et al., "Prognostic modelling options for remaining useful life estimation by industry", 2001, Mechanical Systems and Signal Processing 25, p. 1803-1836 (Year: 2011).

Kwon et al. "IoT-Based Prognostics and Systems Health Management for Industrial Applications", IEEE Access, vol. 4, 2016 (Year: 2016).

* cited by examiner

DETERMINING ITEM MORTALITY BASED ON TRACKED ENVIRONMENTAL CONDITIONS DURING TRANSIT

BACKGROUND

Environmental conditions during transit can negatively impact the condition and expected remaining lifespan of some items when presented to users or consumers. Conditions experienced during transit, such as subjection to vibration, shock, heat, humidity, corrosive conditions, may either be unknown or misrepresented. The uncertainty regarding possible exposure to damaging conditions leads to less predictability in item lifespan and reliability, and thus can negatively impact both consumer confidence and retailers' confidence in suppliers and transporters.

SUMMARY

Systems and methods are disclosed for determining item mortality based on tracked environmental conditions during transit of goods, such as vibration, temperature, humidity, shock, corrosive conditions, and other conditions that may cause degradation. For complex items, multiple different internal components may have varying degrees of susceptibility to damage from unfavorable conditions, with each of the components able to individually cause a failure of the entire item. Thus, the specific set of internal components may drive item mortality prediction, such as predicted failure rates and remaining lifespan. Sensors may be located in shipping containers that share data collected throughout the supply chain, using a blockchain, to increase confidence in the integrity of the data. The use of mortality models generated with anonymized component or process data may enable manufacturers to protect trade secrets, even while leveraging the manufacturer's knowledge of the specific components or processes used in complex items to enhance precision of the mortality models.

Some embodiments of a system for determining item mortality based on tracked environmental conditions during transit implemented on at least one processor may comprise a processor; and a computer-readable medium storing instructions that are operative when executed by the processor to: receive sensor data for environmental conditions experienced by an item during transit; based at least on the received sensor data, determine mortality data for a first component of the item; based at least on the received sensor data, determine mortality data for a second component of the item, different from the first component; based at least on mortality data for the first component and mortality data for the second component, determine mortality data for the item; and based at least on the mortality data for the item and disposition rules, generate a disposition recommendation for the item. The disposition recommendation may be for a retail outlet, regarding whether to accept the goods into inventory or for a consumer, regarding whether to accept delivery of an item.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
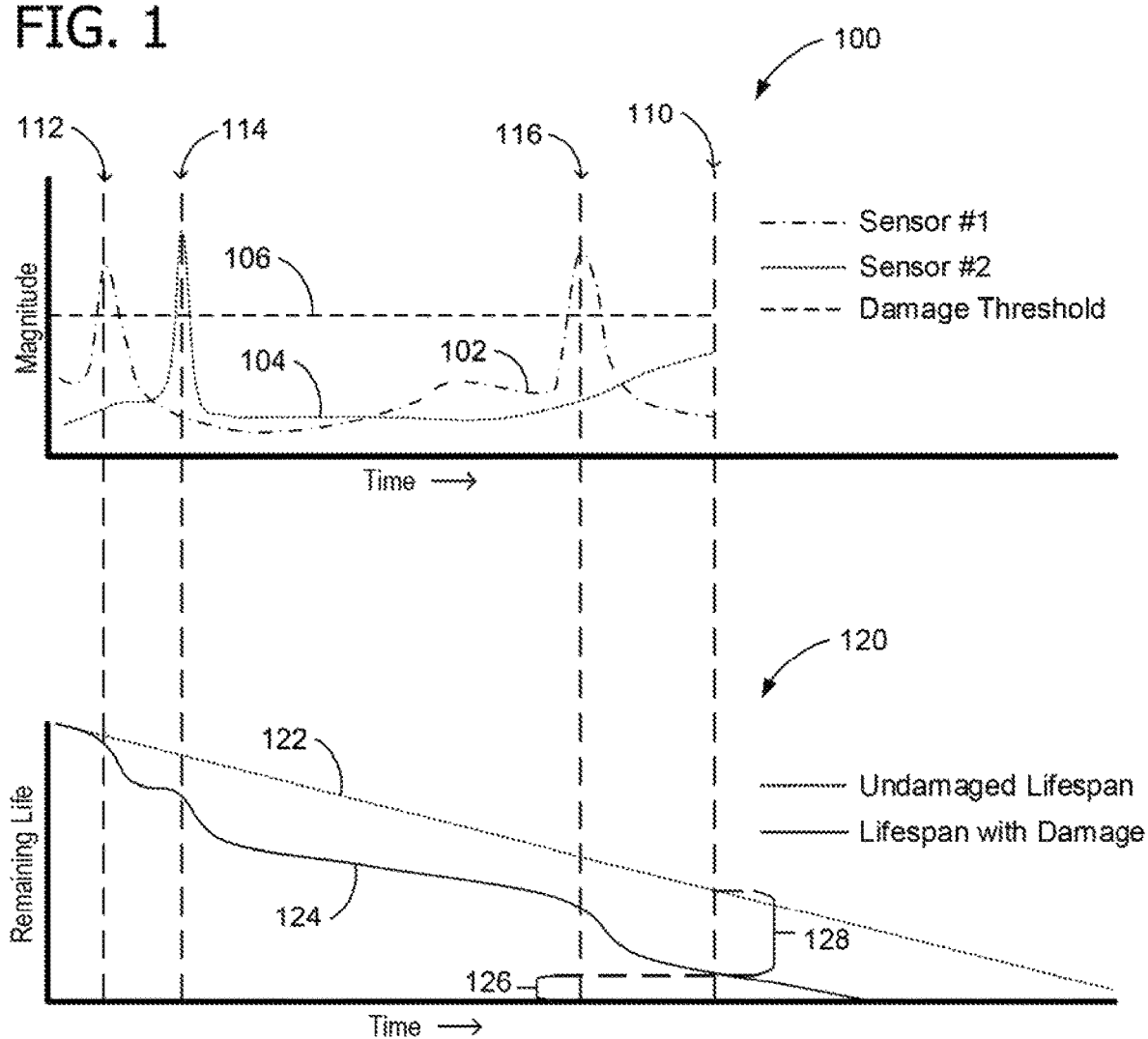
FIG. 1 provides a comparison of sensor reading events and remaining lifespan values.

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum.

Environmental conditions during transit can negatively impact the condition and expected remaining lifespan of some items when presented to users or consumers at a retail establishment. Conditions experienced during transit, such as subjection to vibration, shock, heat, humidity, corrosive conditions, may either be unknown or misrepresented. The uncertainty regarding possible exposure to damaging conditions leads to less predictability in item lifespan and reliability, and thus can negatively impact both consumer confidence and retailers' confidence in suppliers and transporters. For example, excessive heat, vibration, and conditions leading to corrosion or oxidation can cause premature failures in certain electronic devices, without the damage being noticeable from a visual inspection at the time of delivery or purchase. If a consumer purchases an item that has latent damage incurred during transit, the retailer may lose money and additionally suffer reputation damage.

It may therefore be advantageous for retailers (and others in the supply chain), to ascertain whether an incoming shipment of goods has been subjected to unfavorable environmental conditions during transit, so the retailer can reject the shipment, or demand a reduced price that reflects the lower value of the damaged goods. Some of the advantages may be more pronounced for longer journeys, covering greater distances, while passing through the possession of multiple different carriers—for example, international transit of expensive electronic goods.

Referring to the figures, examples of the disclosure enable determining item mortality based on tracked environmental conditions during transit of goods, such as vibration, temperature, humidity, shock, corrosive conditions, and other conditions that may damage the goods. For complex items, multiple different internal components may have varying degrees of susceptibility to damage from unfavorable conditions, with each of the components able to individually cause a failure of the entire item. Thus, the specific set of internal components may drive item mortality prediction, such as predicted failure rates and remaining lifespan, that uses sensor measurement and other data. Sensors may be located on or in shipping containers that share data collected from throughout the supply chain, using a blockchain, in order to increase confidence in the integrity of the data.

In some embodiments, containers, pallets, and transportation vehicles may be supplied with sensor devices that can send information, that eventually reaches and analysis node that can determine the condition of the items. Sensors in each container can monitor the exposure of the items within the container to various conditions, as the container is transported from a manufacturer's location to a destination. Similarly, sensors in the different transport vehicles may monitor the exposure of containers to various conditions, as the container is transported by that particular vehicle. Thus, if multiple transport carriers handled an item that was damaged, the incident causing the damage may be isolated to the responsible carrier.

Sensor measurement data may be continually streamed, sent on a periodic interval or perhaps certain conditions may trigger a data recording or transmission event, such as some sensor measurement exceeding a threshold or being outside recommended values. Sensor measurement data and other data, such as location and time information, may be recorded in a blockchain, for distribution and to increase confidence in the data's integrity. The measurement and other data may then be used with a mortality model to generate a mortality prediction, including expected lifespan and failure rates. The mortality model may use input from the manufacturer, based on internal components and manufacturing processes. For some embodiments, rules applied to a mortality prediction may determine acceptance criteria and recommended disposition.

The ability to confidently identify transit conditions, and their potential impact on individual components of a complex item, can enable identifying when an item may have endured latent damage. This additional insight into item history can improve confidence in items that have not been subjected to unfavorable transit or storage conditions. Items known to have been subjected to adverse environmental conditions may be rejected by a retailer, or marked in a manner to alert customers to potential performance and reliability issues and priced accordingly. The retailer may then experience a lower return rate for defective products. Additionally, the use of mortality models generated with anonymized component or process data may enable manufacturers to protect trade secrets, even while leveraging the manufacturer's knowledge of the specific components or processes used in complex items to enhance precision of the mortality models.

FIG. 1 provides a comparison of sensor reading events and remaining lifespan values. In graph 100, measurement data 102 is plotted for a first sensor (Sensor #1), with the sensor measurement magnitude given as a function of time. Similarly, measurement data 104 is plotted for a second sensor (Sensor #2), also with the sensor measurement magnitude given as a function of time. A threshold 106 is also illustrated. Graph 100 is notional, without units specified. For example, measurement data 102 may be temperature, scaled in graph 100 so that threshold 106 represents a first threshold (a temperature threshold), above which damage may be expected. And measurement data 104 may be shock (g-force), scaled in graph 100 so that threshold 106 represents a second threshold (a shock threshold), above which damage may be expected. Measurement data 102 and measurement data 104 stop at a delivery event 110. However, illustrated within graph 100 are three events that have occurred during transit: a first temperature spike 112, a shock (high g-force) event 114, and a second temperature spike 116. In some situations, damage may not be a binary determination, but may be probabilistic, such as altering a failure rate from a first percentage to a second, higher percentage.

In graph 120, a predicted lifespan 122 for an undamaged item is plotted with the expected remaining life given as a function of time. A predicted lifespan 124 for a damaged item is also plotted with the expected remaining life given as a function of time. These are notional plots, and should not be interpreted as being representative of any particular item. As illustrated in graph 120, the expected remaining life of the damaged item terminates while an undamaged item still has some expected remaining life.

Graph 120 is aligned with graph 100, so that events, such as 112, 114, and 116 coincide. As can be seen in graph 120, predicted lifespan 124 experiences rapid decreases coinciding with first temperature spike 112, shock event 114, and second temperature spike 116. The result is that, at the time of delivery (delivery event 110), the damaged item has a shortened expected remaining life 126. The difference 128 (lost lifespan) may be ascertained at delivery event 110, and used to determine a disposition of the item, such as acceptance, acceptance as a discounted price, diversion to a secondary market, or refusal of delivery. Although predicted lifespan 124 is illustrated as having reductions at discrete events, such as 112, 114, and 116, some items may be able to tolerate short or infrequent adverse incidents, with damage caused by prolonged or repeated exposure.

Figure 2:
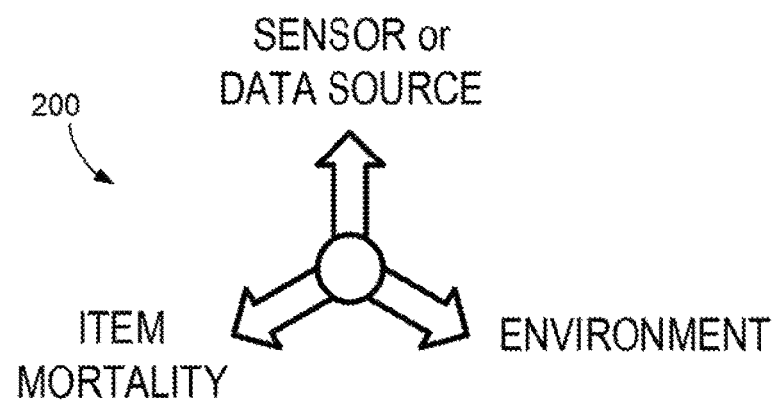
FIG. 2 illustrates a notional link among sensor measurements (or other data), environmental conditions experienced during transit, and item mortality.

FIG. 2 illustrates a notional triad 200 linking sensor measurements (or other data), environmental conditions experienced during transit, and item mortality. The environment experienced during transit and storage and impact item mortality, such as by degrading the item or item components. The environment experienced during transit can also be measured by sensors, to produce a data log. The data log, containing data from sensors and other data sources, can be used to predict item mortality. Thus, the sensor measurements (or other data), environmental conditions experienced during transit, and item mortality may be linked.

Figure 3:
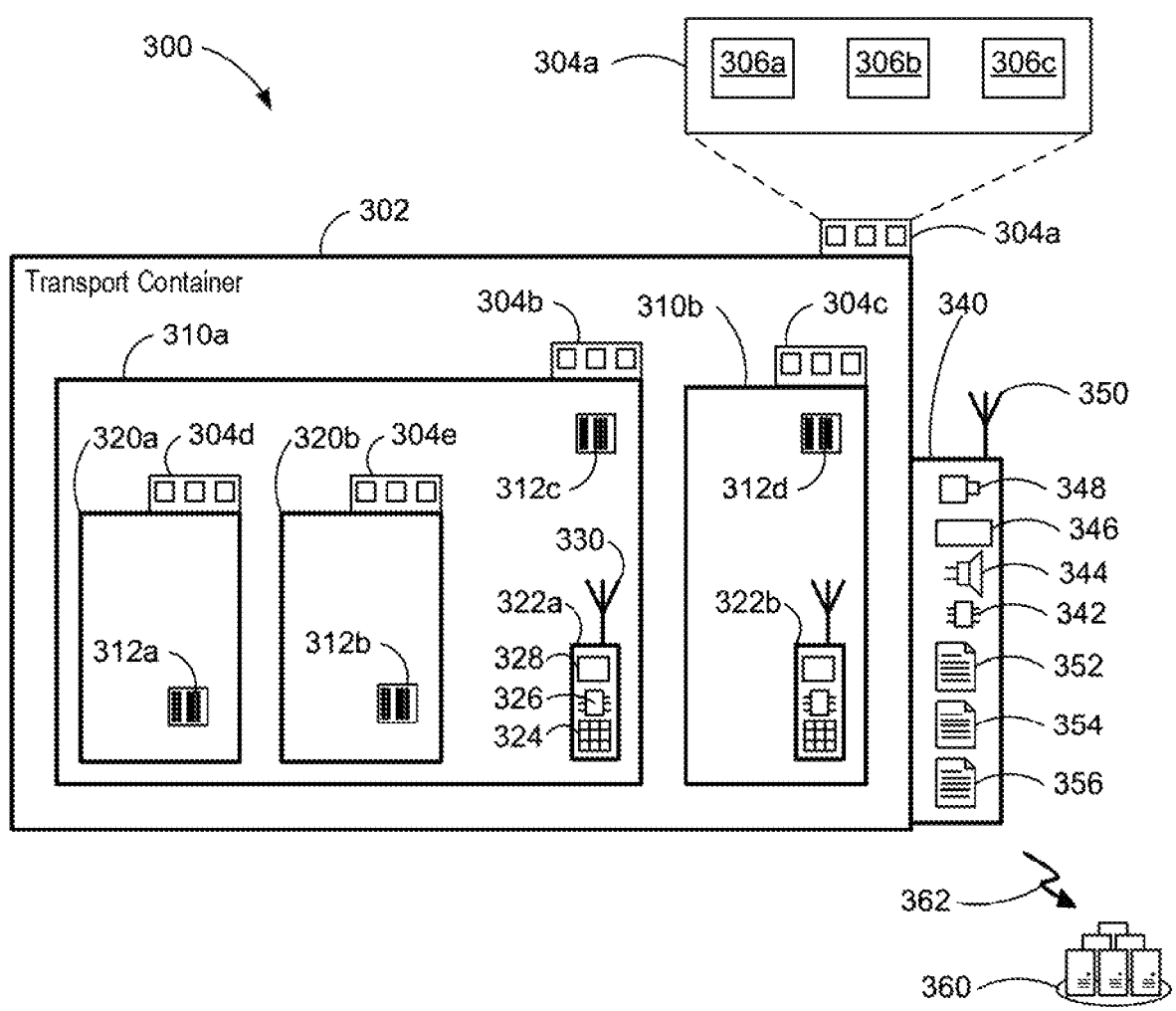
FIG. 3 illustrates a transit arrangement including sensors to track environmental conditions during transit.

FIG. 3 illustrates a transit arrangement 300 including sensors to track environmental conditions during transit. Transit arrangement may represent any type of transit, including postal service delivery to a consumer (such as the USPS), railroad carriage, truck trailers, air cargo, and trans-oceanic cargo ships. A transport container 302 has a sensor set 304a, which may be located inside of container 302, outside of container 302, or a combination. Sensor set 304a is shown in detail, as containing sensors 306a, 306b, and 306c. Although sensors 306a-306c are illustrated as being located together, it should be understood that any feasible physical arrangement may be used. Additionally, it should be understood that, although three sensors are illustrated, any number of sensors may be used. Sensors 306a-306c may include any of temperature, humidity, air pressure, condensation and moisture pooling, salinity (or other corrosive conditions), $CO_2$ levels (and other gasses), time, shock and vibration, location (including altitude and latitude/longitude), and other sensors, including duplicates of any sensor type. Some sensors may measure conditions indicative of damage, whereas other sensors, for example location, may indicate country-of-origin and transit routes. In some scenarios, location data may be useful for customs inspectors. Other data sources may include the identity of shipping entities, planned routes, dates, weather, and other information.

Shown within transport container 302 are other containers 310a and 310b, each also having a sensor set 304b and 304c, respectively. Sensor sets 304b and 304c may have a similar or different set of individual sensors as sensor set 304a. Shown within container 310a are two item containers 320a and 320b, each also having a sensor set 304d and 304e, respectively. Sensor sets 304d and 304e may have a similar or different set of individual sensors as sensor set 304a. Container 310b may also hold similar item containers. Containers 302, 310a, 310b, 320a, and 320b may variously represent any of a tote, a rail car, a truck trailer, a shipping container, a drone bay, an automatic guided vehicle (AGV) hold, or another container used in the transport of goods. In the illustrated arrangement, containers 320a, 320b, 310a, and 310b have identification barcodes 312a, 312b, 312c, and 312d, respectively, although it should be understood that another type of tracking, such as 2D barcodes, radio frequency identification (RFID) tags, near-field communication (NFC), or another identification scheme may be used.

The nested arrangement of containers having sensor sets, within another container having a sensor set may be repeated for a number of levels. The sensor sets may be configured and positioned to sense conditions experienced by a particular portion of an item or container, perhaps to correspond with a particular susceptible component, such as a moisture sensor set at a height to trigger an alarm only if moisture has pooled to a sufficient depth to cause damage but not trigger an alarm for lesser pooling Also, as illustrated in FIG. 3, container 310a has a lock unit 322a, which includes a keypad 324, a logic module 326, a power source 328, and a wireless communication module 330. Keypad 324 may operate an electronic door lock, and record all access (unlocking and/or opening) events and attempts, possibly in conjunction with a door position sensor (not shown). Logic module 326 is in communication with sensor set 304b and has processing logic and storage for data, such as the access events and data from sensor set 304b. If logic module 326a is also in communication with sensor sets 304d and 304e, it can record data from those sensor sets, also. Power source 328 may include a battery and/or a solar cell, and possibly include a wireless charging capability. Power source 328 provides power for keypad 324, logic module 326, and wireless communication module 330. Wireless communication module 330 may be Wi-Fi or Bluetooth™, and permits data stored in logic module 326 to be sent to external storage and monitoring locations. Similarly, container 310b has a lock unit 322b that may be equivalent to lock 322a, or have different capabilities.

Lock units 322a and 322b may be blockchain-enabled, including a tamper-evident blockchain-registered component that renders unauthorized access or modification detectable. Lock units 322a and 322b may further generate a new blockchain entry at certain events, stored locally, and communicated to a controller unit 340 on transport container 302, perhaps wirelessly. Controller unit 340 includes a logic module 342, an alarm 344, a power source 346, a cargo sensor 348, and a wireless communication module 330.). Logic module 326 is in communication with sensor set 304b and has processing logic and storage for data, such as the access events and data from sensor set 304a and data received from lock units 322a and 322b. Logic module 326a is also in communication with alarm 344 and cargo sensor 348, in order to create alerts when cargo is missing or if lock units 322a or 322b are tampered with. Power source 328 may include a battery and/or a solar cell, and possibly include a wireless charging capability. Power source 328 provides power for the components of controller unit 340. Alarm 344 may generate an audible alarm to alert humans and/or an alarm signal for detection by a monitoring station.

Cargo sensor 348 may be a camera, a barcode reader (to read any of barcodes 312a-312d that are visible), an NFC reader, an RFID transponder, or any other type of sensor that can detect whether containers 310a and 310b have been loaded, removed, or are present. In this manner, controller unit 340 can record products entering or leaving the blockchain enabled container. Wireless communication module 350 may be Wi-Fi or Bluetooth™, or even cellular, and permits data stored in logic module 326 to be sent to external storage and monitoring locations or received from external sources. Although lock units 322a and 322b are illustrated on containers 310a and 310b, respectively, and in communication with controller unit 340 on transport container 302, it should be understood that a communication relationship may exist among any of the different tiers in a nested arrangement, and may even skip a tier. For example, a lock unit, similar to lock unit 322a, may be placed on container 320a for communication either with lock unit 322a (with the information relayed to controller unit 340), or skipping lock unit 322a and communicating directly with controller unit 340. In some embodiments, controller unit 340 may intake prior-generated data relating to containers 310a and 310b when they are loaded, for example, perhaps wirelessly from a smart fork lift that is loading containers 310a and 310b into transport container 302. Controller unit 340 may also generate data for registration in a blockchain every time container 302 is opened, or any containers are added or removed. Any or all of this data may then be stored in logic module 342 and transferred to the next recipient.

Stored within logic module 326 are a data log 352, which holds the data described above for upload to a blockchain, a cargo manifest 354 listing cargo that should be on-board transport container 302, and a list 356 of containers (for example, 310a and 310b, possibly down to the level of detail of containers 320a and 320b) that are actually on-board. In the event of a discrepancy between cargo manifest 354 and list 356, logic module 342 will cause alarm 344 to generate an alert that the loaded items are either missing a container or have a container that should not be present. The containers may be identified by scanning as they are loaded and removed, or in place, with RFID tags that can ascertain which containers are within proximity of an RFID transponder. As data is generated regarding which containers are loaded or removed, when doors are opened to grant access, and perhaps the geographical coordinates which loading or loading occurs, it may be combined with sensor measurements and other data to produce blockchain records. The blockchain record data is transmitted to a remote data store 360 over communication link 362, which may be wireless, and which may use wireless communication module 350 or some other communication connectivity.

Figure 4:
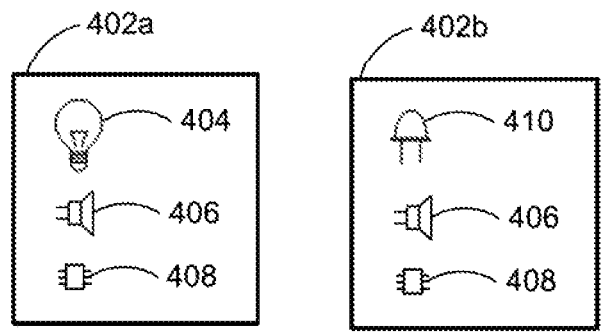
FIG. 4 illustrates two functionally similar items having differing susceptibility to adverse environmental conditions due to differing internal components.

FIG. 4 illustrates two functionally similar items 402a and 402b, having differing susceptibility to adverse environmental conditions due to differing internal components. For example, item 402a includes an incandescent light bulb 404, a speaker 406, and a logic module 408 that included integrated circuits, whereas item 402b includes a light emitting diode (LED) 410, a speaker 406, and a logic module 408. Typically, incandescent lightbulbs are more prone to failure from vibration and shock, due to the fragility of the filament.

Thus, if items 402a and 402b are both subject to the same shock and vibration forces that are sufficient to damage incandescent bulb 404, but not damage LED 410, item 402a may be inoperable while item 402b may be fully operable.

Long exposure to high humidity can cause the paper in some audio speaker cones to saturate and weaken, whereas speaker cones made from other materials may be less susceptible to humidity. Thus, items 402a and 402b have susceptibilities that affect mortality due to the specific components. It may be that the manufacturer of items 402a and 402b sells them as the same model device, but has switched from using incandescent bulbs to using LEDs for certain illumination needs. The consumers may not notice the difference between items 402a and 402b, saving the manufacturer the expense of changing packaging and preserving the investment in advertising the earlier-design product. However, the manufacturer may wish to keep its component list confidential, and thus does not wish to disclose the change from incandescent bulbs to LEDs or the use of inexpensive paper in the speakers.

Therefore, the manufacturer may effectively anonymize the component data, and merely report the environmental conditions to avoid, such as by specifying thresholds at which damage is expected to occur. Thus, for example, threshold 106 in graph 100 of FIG. 1 may be set for temperature (based on tolerances of logic module 408), or humidity (based on speaker 406), or shack or vibration forces (based on incandescent bulb 404 or LED 410). The manufacturer may disclose these problem thresholds, based on the different internal components, without actually specifying which components drove the thresholds or what the components are, specifically. This then permits others, later in the supply chain, up through the consumer, to identify that item 402a is more likely to become degraded from shock and vibration than is item 402b, but without necessarily knowing why. Alternatively, the manufacturer may anonymize the components, identifying that two internal components in each of items 402a and 402b have the same part numbers, while one component is different. If the manufacturer provides information tying the different part numbers to the different damage or degradation thresholds, the others can identify that a different internal component is being used, but may not be able to easily ascertain that the components are.

In a scenario such as this, in which an item with multiple components that each have their own unique degradation in response to adverse environmental conditions and unique effects on life expectancy, a tiered mortality analysis may be used: predicting mortality for each component, and then flowing the results upward into the overall or composite item mortality.

Figure 5:
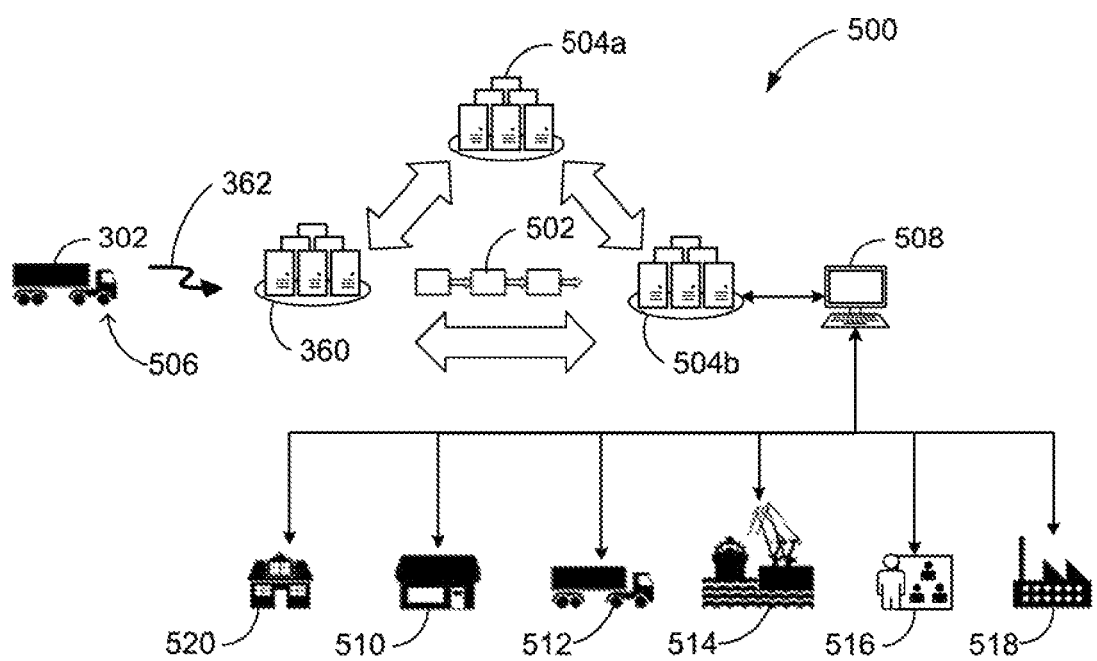
FIG. 5 illustrates a data distribution arrangement that uses a blockchain to increase confidence in sensor measurement data.

FIG. 5 illustrates a data distribution arrangement 500 that uses a blockchain 502 to increase confidence in sensor measurement data. Blockchain 502 is distributed among a plurality of interconnected nodes, including data store 360 and nodes 504a and 504b. A full copy of blockchain 502 is available from any of data store 360 and nodes 504a and 504b, within the constraints of network latency.

In arrangement 500, transport container 302, on transport vehicle 506 transmits blockchain record data to data store 360 over communication link 362, as described above for FIG. 3. Once entered into the blockchain, network connectivity among data store 360 and nodes 504a and 504b. As illustrated, a terminal 508 polls blockchain 502 to retrieve sensor data. This data may be used by a retailer 510 that will be selling the goods to consumers; a subsequent shipper 512 that is planning to take delivery and move the goods closer to retailer 510; a customs agent or importer 514; an insurer 516 that is insuring the goods in transit or will be insuring warranty claims; the manufacturer 518; or anyone else with an interest in learning the condition of the goods in transit. In addition to retailer 510 determining disposition regarding inventory delivered to the retailer's facility, a consumer may use the disclosure herein to determine whether to accept delivery of items delivered to a consumer residence 520.

Retailer 510 may be interested in ascertaining whether the goods will be in salable condition, and shipper 512 may be interesting in ascertaining whether the goods had already been damaged, prior to shipper 512 taking possession. A smart contract may be in place between shipper 512, and the shipper who currently has possession, and sensor measurements indicating damage may be trigger an action or obligation under the smart contract. A smart contract may also exist that includes any of insurer 516, retailer 510, manufacturer 518, or another party, and involves obligations or actions that trigger upon damaging conditions being sensed. Container manifests, possibly including tariff codes, may be required for tariff systems at ports of entry, and by placing product and environmental exposure data in a blockchain, the product and its supply chain can be verified by customs agent or importer 514. Data may be provided in an advance shipping notification and an electronic bill of lading, and copied into the blockchain 502.

Blockchain 502 permits verification of information associated with items; some data may not be shareable with everyone in the supply chain. Blockchain 502 can provide a level of confidence that the items being received are the correct items, and that improper access has not been granted to anyone during transit. Each transaction from the manufacturer, to the shipper, to the freight forwarder, to the shipping line, to the longshoremen, to the trucking company, and eventually to the distribution center can be tracked. Blockchain 502 can record transaction data, including location and other sensor measurements, at each turnover event for a container. In some scenarios, video data covering the loading of a secure container by the source and unloading of the container at the destination, may be placed into blockchain 502.

Figure 6:
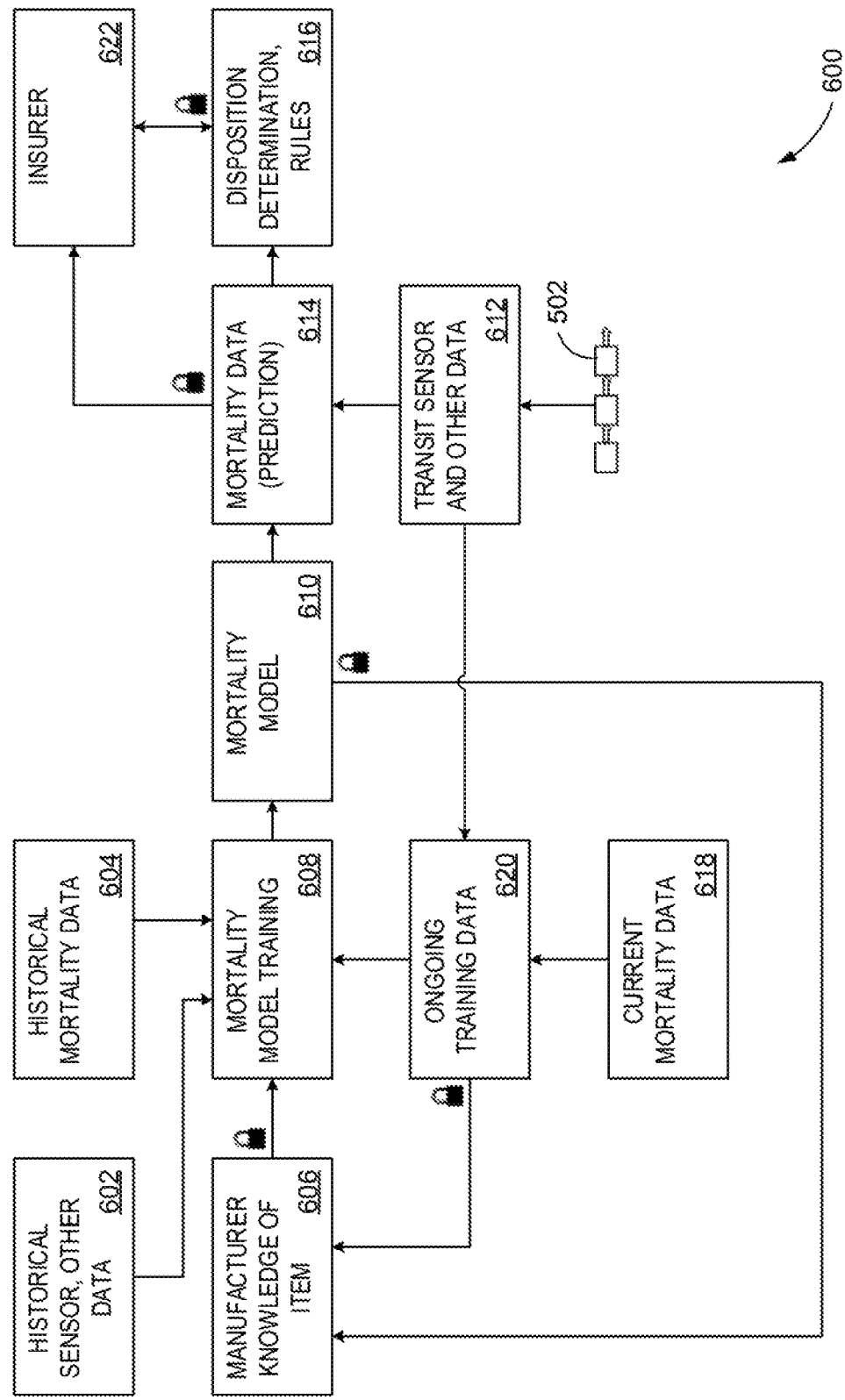
FIG. 6 illustrates an item mortality prediction scheme that can advantageously use data obtained from the arrangement of FIG. 5.

FIG. 6 illustrates an item mortality prediction scheme 600 that can advantageously use data obtained from arrangement 500 of FIG. 5 to determine item mortality based on tracked environmental conditions during transit. In the illustrated embodiment, historical sensor data 602 is collected and paired with historical mortality data 604 (including failure rates and descriptions, repair rates and descriptions, warranty claims, etc.) to create a neural net training data set, and then provided to a mortality model training module 608. Mortality model training module 608 generates a mortality model 610 using a neural net trained with historical sensor data 602 and historical mortality data 604. This enables generating mortality model 610 based on real-world failure and lifespan data; alternatively, mortality model 610 may be trained at least partially on human-specified or synthetically-generated data. Mortality model training module 608 may generate mortality model 610 as a tiered mortality model, using data for a first component of the item and data for a second component of the item. That is a tiered mortality model may predict failure rates and expected remaining lifespan of individual components, so that, based on those predictions, the failure rate and expected remaining lifespan of the entire item may be predicted.

Information about the components within an item may often be learned from the manufacturer of the item or the manufacturer of a particular component. Suppliers may be required to provide mortality model data and component limitations, such as relationship between environmental conditions and mortality, when bringing in a new product or on-boarding, in addition to disclosing the presence or use of hazardous material. For example, the manufacturer may identify the components that are relevant for determining mortality data, and the environmental conditions that cause degradation. In some situations, however, the manufacturer may be reluctant to identify specific components in complex items, or manufacturing processes used, as these may constitute trade secrets. For example, the manufacturer may have found a new lamination process that saves money by cutting down on defects. However, the manufacturer does not wish to disclose details of the process, and so merely identifies the affected component with an anonymized identifier, along with humidity conditions that cause delamination. The use of mortality models generated with anonymized component or process data may enable manufacturers to protect trade secrets, even while leveraging the manufacturer's knowledge of the specific components or processes used in complex items to enhance precision of the mortality models.

In some scenarios, the manufacturer may be located remotely from there the mortality model 610 is being created or improved, and so sends the relevant information, the manufacturer knowledge of item 606, to mortality model training module 608 securely, perhaps encrypted. Manufacturer knowledge of item 606 will contain data for the first component of the item and data for the second component of the item (as well as other relevant components), to use in the generation of mortality model 610. Manufacturer knowledge of item 606 may also comprise an earlier version of a mortality model. In some embodiments, though, mortality model 610 may be constructed and improved without using manufacturer knowledge of item 606.

Mortality prediction module 614 receives sensor data for environmental conditions experienced by an item during transit from transit sensor data module 612. Transit sensor data module 612 may also have other data, that is also sent to mortality prediction module 614, to use for generating morality data for the item. Transit sensor data module 612 may receive sensor data, such as sensor measurement date, and perhaps even sensor failure data, from blockchain 502. As described above for FIG. 3, the sensor data comprises measurements from at least one sensor, perhaps two or more, selected from the list consisting of: temperature, humidity, air pressure, condensation, salinity, CO2 level, time, shock, and vibration.

Based at least on the received sensor data, mortality prediction module 614 determines mortality data for the first component of the item. Based at least on the received sensor data, mortality prediction module 614 also determines mortality data for the second component of the item, which is a different component than the first component. Mortality prediction module 614 then combines these, so that based at least on mortality data for the first component and mortality data for the second component, mortality prediction module 614 determines mortality data for the item. To accomplish this, mortality prediction module 614 may comparing the received sensor data against a damage threshold to generate the mortality data. This mortality data may include predictions regarding failure rate and/or expected remaining lifespan. In some situations, damage may not be a binary determination, but may be probabilistic, such as altering a failure rate from a first percentage to a second, higher percentage. Thus, mortality data may also be probabilistic.

Mortality prediction module 614 may compare the received sensor data against more than just one threshold, and may compare against a plurality of thresholds. The thresholds may be specific to different internal components, so that the failure of a specific component can be predicted, leading to a prediction of a failure of the entire item. In some embodiments, rather than merely using a single threshold for damage determination, the duration of exposure to certain conditions, or frequency of repeated exposures may be determined. For example, a component may be able to endure a single shock event of a given g-force, but receiving multiple shock events at the same g-force level may cause damage. Similarly for humidity, a component may be able to survive short-term exposure to humidity above some level (for example, perhaps less than an hour), but long-term exposure (for example, perhaps days), may cause adverse effects, such as de-lamination, warping, or weakening. In conjunction with comparing the received sensor data against a damage threshold or thresholds, or alternatively, mortality prediction module 614 use with the received sensor data in mortality model 610 to generate the mortality data for the item.

Based at least on the mortality data for the item and disposition rules, a disposition determination module 616 generates a disposition recommendation for the item. The disposition rules may specify exposure conditions or mortality data that leads to acceptance, acceptance, but at a reduced price, deferral to a secondary inventory market, or rejection. Items that are degraded and are to be sold on an "as-is" basis for a reduced price may be accepted from the supplier or transporter at a reduced price. Deferral to a secondary market may include sending to an outlet facility where consumers may be expecting items to contain flaws, such as perhaps an affiliate of the retailer or an independent entity. Another secondary market option may be a refurbishing center that will carefully inspect the item and make necessary repairs. Additionally, an insurer 622 may have input to the disposition rules in disposition determination module 616, learn of the disposition from disposition determination module 616 (possibly through a claim automatically generated by disposition determination module 616), and/or receive a secure copy of mortality data from mortality prediction module 614.

Sensor data from transit sensor data module 612 may also be sent to an ongoing training data module 620 that may be used to further train the neural net trained with the received sensor data. Ongoing training data module 620 receives data from transit sensor data module 612 and also current mortality data 618, possibly including warranty claim and other repair and failure data. This data may be combined into training data sets and sent to mortality model training module 608 for use in training the next version of mortality model 610.

Ongoing training data module 620 may also send data from transit sensor data module 612 and current mortality data 618 to the manufacturer, to include in the next version of manufacturer knowledge of item 606 and/or to be used to improve the item or components of the item to reduce susceptibility to damage. Ongoing training data module 620 may send this information securely, such as encrypted, when the manufacturer is located remotely. Optionally, the manufacturer may securely obtain a copy of the current mortality model 610, if another entity is requesting to use it for generating an independent mortality model.

Figure 7:
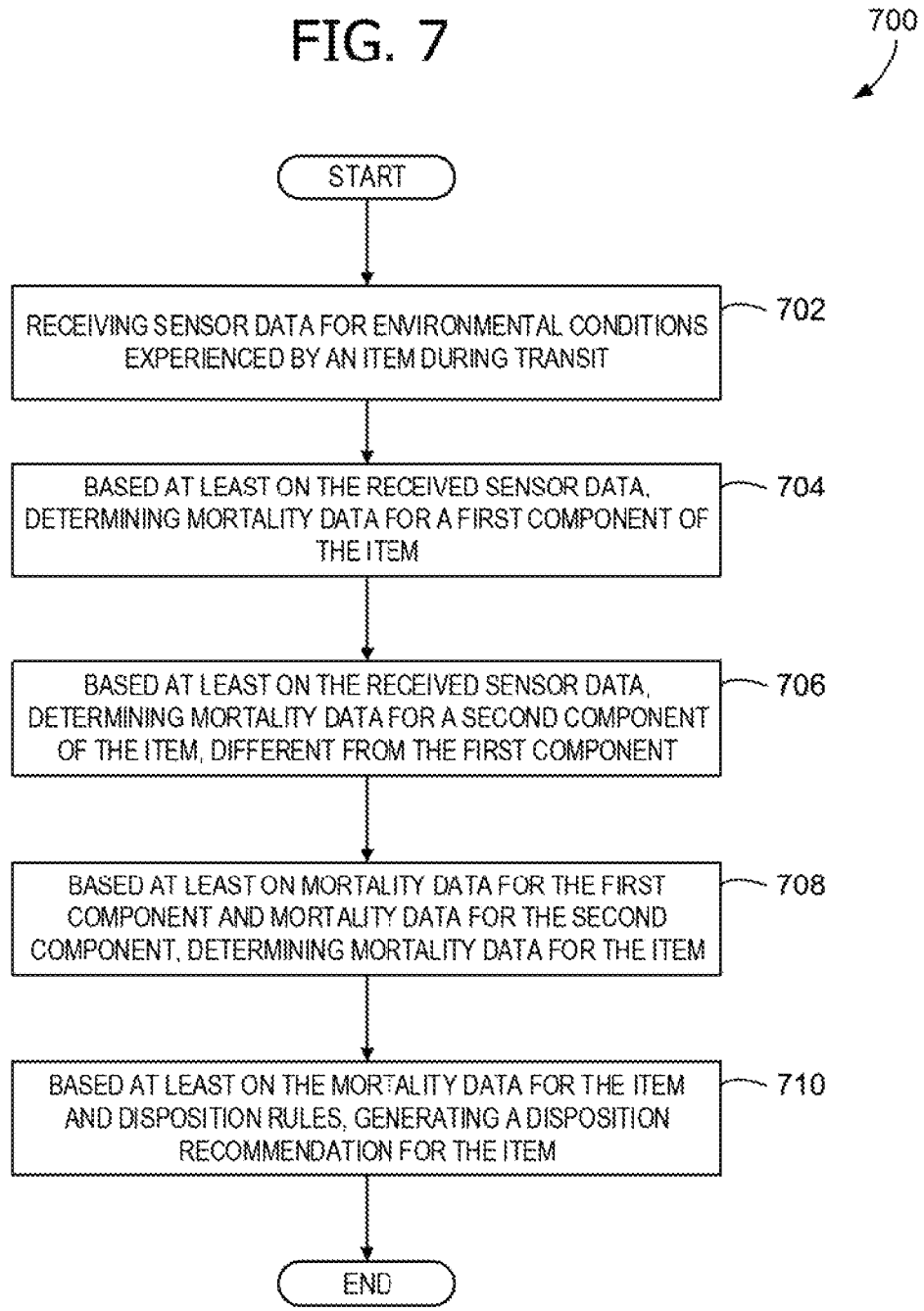
FIGS. 7-8 show flow charts illustrating exemplary operations involved in determining item mortality based on tracked environmental conditions during transit.

FIG. 7 shows a flow chart 700 illustrating exemplary operations involved in determining item mortality based on tracked environmental conditions during transit. More specifically, flow chart 700 illustrates an exemplary operation of determining item mortality based on tracked environmental conditions during transit. Flow chart 700 may be used by retailers, consumers, insurers, shippers, and other entities. The operations illustrated in flow chart 700 may be performed by any processing unit or computing node, such as the computing device of FIG. 9. Operation 702 includes receiving sensor data for environmental conditions experienced by an item during transit. Operation 704 includes, based at least on the received sensor data, determining mortality data for a first component of the item. Operation 706 includes, based at least on the received sensor data, determining mortality data for a second component of the item, different from the first component. Operation 708 includes, based at least on mortality data for the first component and mortality data for the second component, determining mortality data for the item. Operation 710 includes, based at least on the mortality data for the item and disposition rules, generating a disposition recommendation for the item. For a retailer, generating a disposition recommendation may involve generating a recommendation regarding inventory delivered to the retailer's facility, whereas for a consumer, generating a disposition recommendation may involve generating a recommendation regarding acceptance of items delivered to an end consumer. In addition to retailers and consumers, generating a disposition recommendation may involve generating a recommendation that is tailored to the specific needs of a subsequent shipper, a customs agent, an importer, in insurer, a manufacturer, or another entity with a need to learn the condition of the goods in transit.

Figure 8:
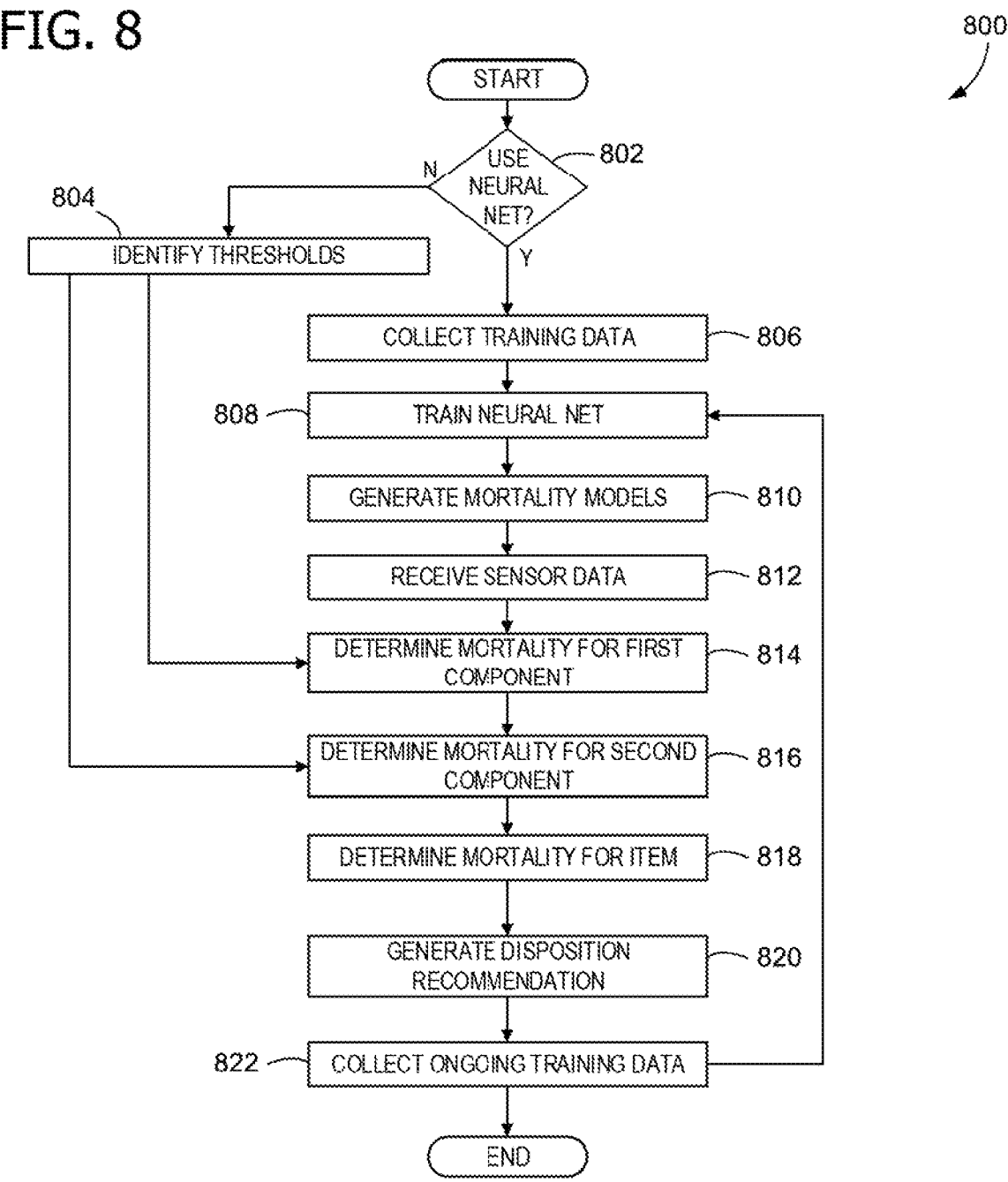

FIG. 8 shows another flow chart 800 illustrating exemplary operations involved in determining item mortality based on tracked environmental conditions during transit. The operations illustrated in flow chart 800 may be performed by any processing unit or computing node, such as the computing device of FIG. 9. In decision operation 802, a neural net or simpler threshold comparison is chosen. It a simpler threshold is to be used, then operation 804 identifies thresholds of sensor measurements that are associated with damage or degradation. This may include both simple threshold comparisons, which determine whether damage thresholds have been exceeded, and more complicated analysis that take into account exposure times and the number of occurrences. If, however, a neural net or artificial intelligence (AI) is to be used, then operation 806 will collect training data. Training data may include historical sensor data, historical mortality data, manufacturer information, and prior mortality models. Operation 808 will then train the neural net.

Operation 810 will generate mortality models, perhaps including a tiered mortality model that has sub-models for individual components included within a larger item. In operation 810, this may include generating the mortality model using a neural net trained with historical sensor data and historical mortality data. In some embodiments, for items having a first component and second component included within the item, generating the mortality model further comprises generating the mortality model using data for the first component and data for the second component.

As the item is in transit or storage, or preparing for transit or storage, operation 812 involves receiving sensor data for environmental conditions experienced by the item during transit, and possibly, also environmental conditions experienced by the item during storage. Receiving sensor data comprises receiving sensor data from a blockchain, as described above in FIG. 5. The sensor data comprises measurements from at least one sensor selected from the list consisting of temperature, humidity, air pressure, condensation, salinity, CO2 level, time, shock, and vibration. In some embodiments, the sensor data comprises measurements from at least two sensors selected from the list consisting of temperature, humidity, air pressure, condensation, salinity, CO2 level, time, shock, and vibration. Other sensors may be used, including moisture pooling, corrosive conditions, other gasses, time, and location (including altitude and latitude/longitude), including duplicates of any sensor type.

Operation 814 includes, based at least on the received sensor data, determining mortality data for a first component of the item, and operation 816 includes, based at least on the received sensor data, determining mortality data for a second component of the item, different from the first component. For example, the first component may be an incandescent light bulb that is susceptible to damage from shock or vibration, and the second item may be a laminated portion of a housing that is susceptible to damage from high humidity levels. In some embodiments, determining mortality data for a component of the item comprises comparing the received sensor data against a damage threshold to generate the mortality data. In some embodiments, determining mortality data for a component of the item comprises using the received sensor data in a mortality model to generate the mortality data. Some embodiments, however, may use a combination of threshold exposure analysis and a mortality model derived from a neural net.

Operation 818 involves, based at least on mortality data for the first component and mortality data for the second component, determining mortality data for the item. That is, the mortality model may be tiered, such that the mortality of the larger item is determined by the mortality data for the individual components. For example, perhaps the first component has not entirely failed, but has degraded, and similarly the second component has not entirely failed, but has also degraded. The combination of the degradation of the first component with the degradation of the second component, however, may result in a determination of a failure of the item. As a further example, the mortality data may be probabilistic, such that it is determined that the first component has a 50% chance of failure. If only the first component had this likelihood of failure, and no other components had been damaged, then the entire item would then have a 50% chance of failure. However, perhaps the second component also has a 50% chance of failure, based on a different environmental condition exposure. If the chances of failure are statically independent, and failure of either the first component or the second component can cause failure of the entire item, then the item has a 75% chance of failure and only a 25% chance of operating properly. With such a composite tiered mortality model, the individual chances of failure for different components may be combined to ascertain the total chance of failure. Thus, a chance of failure (for one component) that may not be enough to cause a rejection of an item may combine with other chances of failure for other components to trigger a rejection of the item.

Operation 820 includes, based at least on the mortality data for the item and disposition rules, generating a disposition recommendation for the item. Some embodiments may be used by consumers, rather than retailers; some may be used by shippers (taking in from other shippers); some embodiments may be used by insurers; some embodiments may be used by customs agents or importers; some embodiments may be used by manufacturers; and some embodiments may be used by insurers any other suitable entity.

Thus, generating a disposition recommendation may include generating a disposition recommendation that is tailored to the specific type of user. Consumers, for example, may not have the ability to defer incoming goods to secondary markets, but may be presented with a fewer set of options: accept or reject. As indicated above, the disposition for an item may not be merely determined based on a single component's mortality data (although if the single component has failed, then that may be determinative), but instead, the disposition recommendation may be determined by a more complex combination of the mortality data of the individual components. Disposition options for the item may include acceptance, acceptance as a discounted price, diversion to a secondary market, or refusal of delivery. The mortality data may additionally be returned to the manufacturer or an insurance company, to use for ascertaining whether the item warranty has been voided, or a particular shipper was at fault for damage.

Operation 822 will collect ongoing training data and return it to operation 808 for further training the neural net trained with the received sensor data. Other mortality data may also be included in the ongoing training data, such as warranty claim and other repair and failure data. In some embodiments, early use of the sensor data may be with a simpler threshold analysis of operation 804, but as data is collected, enough may be used for training a neural net to generate a mortality model.

In some examples, the operations illustrated in the flowcharts may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements. While the aspects of the disclosure have been described in terms of various examples with their associated operations, a person skilled in the art would appreciate that a combination of operations from any number of different examples or some reordering is also within scope of the aspects of the disclosure.

Exemplary Operating Environment

Figure 9:
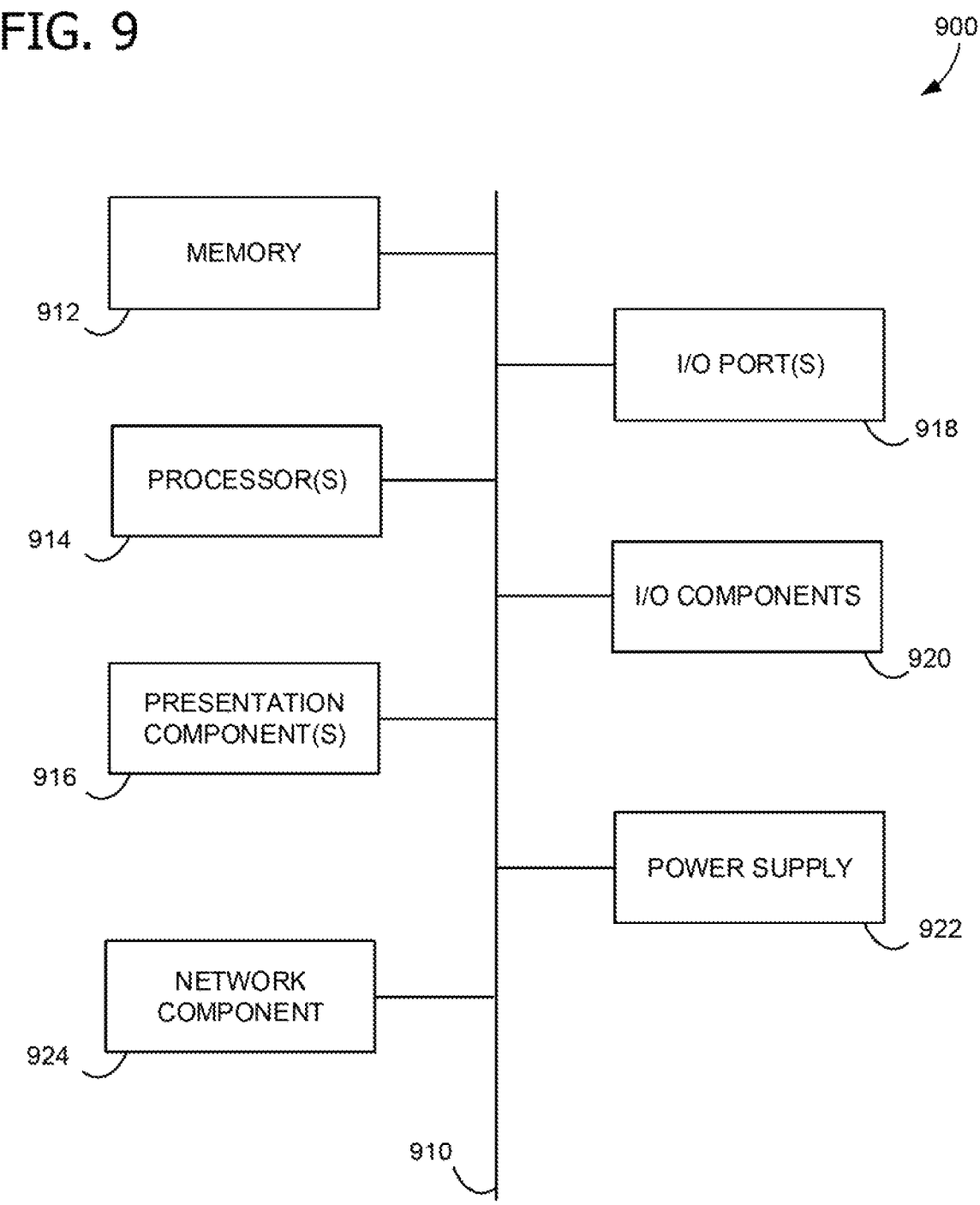
FIG. 9 is a block diagram of an example computing device for implementing aspects disclosed herein.

FIG. 9 is a block diagram of an example computing device 900 for implementing aspects disclosed herein, and is designated generally as computing device 900. Computing device 900 is one example of a suitable computing environment and is not intended to suggest any limitation as to the scope of use or functionality of the invention. Neither should the computing device 900 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments, where tasks are performed by remote-processing devices that are linked through a communications network. For example, a distributed computing environment may host cloud synthetics services.

Some embodiments of synthetics services may provide synthetic 3D environments as well as rendering a surface in a synthetic scene.

Computing device 900 includes a bus 910 that directly or indirectly couples the following devices: memory 912, one or more processors 914, one or more presentation components 916, input/output (I/O) ports 918, I/O components 920, a power supply 922, and a network component 924. Computing device 900 should not be interpreted as having any dependency or requirement related to any single component or combination of components illustrated therein. While computing device 900 is depicted as a seemingly single device, multiple computing devices 900 may work together and share the depicted device resources. For instance, memory 912 may be distributed across multiple devices, processor(s) 914 may provide housed on different devices, and so on.

Bus 910 represents what may be one or more busses (such as an address bus, data bus, or a combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and the references herein to a "computing device."

Memory 912 may include any of the computer-readable media discussed herein. Memory 912 may be used to store and access instructions configured to carry out the various operations disclosed herein. In some examples, memory 912 includes computer storage media in the form of volatile and/or nonvolatile memory, removable or non-removable memory, data disks in virtual environments, or a combination thereof.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flowcharts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900.

Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways.

Ports 918 allow computing device 900 to be logically coupled to other devices including I/O components 920, some of which may be built in. Examples I/O components 920 include, for example but without limitation, a microphone, keyboard, mouse, joystick, game pad, satellite dish, scanner, printer, wireless device, etc.

In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, the network component 924 is operable to communicate data over public, private, or hybrid (public and private) using a transfer protocol, between devices wirelessly using short range communication technologies (e.g., near-field communication (NFC), BLUETOOTH® branded communications, or the like), or a combination thereof.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for determining item mortality based on tracked environmental conditions during transit implemented on at least one processor comprises: a processor; and a computer-readable medium storing instructions that are operative when executed by the processor to: receive sensor data for environmental conditions experienced by an item during transit; based at least on the received sensor data, determine mortality data for a first component of the item; based at least on the received sensor data, determine mortality data for a second component of the item, different from the first component; based at least on mortality data for the first component and mortality data for the second component, determine mortality data for the item; and based at least on the mortality data for the item and disposition rules, generate a disposition recommendation for the item.

An exemplary method for determining item mortality based on tracked environmental conditions during transit implemented on at least one processor comprises: receiving sensor data for environmental conditions experienced by an item during transit; based at least on the received sensor data, determining mortality data for a first component of the item; based at least on the received sensor data, determining mortality data for a second component of the item, different from the first component; based at least on mortality data for the first component and mortality data for the second component, determining mortality data for the item; and based at least on the mortality data for the item and disposition rules, generating a disposition recommendation for the item.

One or more exemplary computer storage devices having a first computer-executable instructions stored thereon for determining item mortality based on tracked environmental conditions during transit, which, on execution by a computer, cause the computer to perform operations which may comprise: receiving, from a blockchain, sensor data for environmental conditions experienced by an item during transit, wherein the sensor data comprises measurements from at least two sensors selected from the list consisting of: temperature, humidity, air pressure, condensation, salinity, $CO_2$ level, time, shock, and vibration; based at least on the received sensor data, determining mortality data for a first component of the item; based at least on the received sensor data, determining mortality data for a second component of the item, different from the first component; based at least on mortality data for the first component and mortality data for the second component, determining mortality data for the item; and based at least on the mortality data for the item and disposition rules, generating a disposition recommendation for the item.

An exemplary system implemented on at least one processor may comprise: a processor; and a non-transitory computer-readable medium storing instructions that are operative when executed by the processor, the instructions comprising logic for implementing any of the methods or processes disclosed herein.

Alternatively, or in addition to the other examples described herein, examples include any combination of the following:

receiving sensor data comprises receiving sensor data from a blockchain;

the sensor data comprises measurements from at least one sensor selected from the list consisting of: temperature, humidity, air pressure, condensation, salinity, CO2 level, time, shock, and vibration;

the sensor data comprises measurements from at least two sensors selected from the list consisting of: temperature, humidity, air pressure, condensation, salinity, CO2 level, time, shock, and vibration;

determining mortality data for a component of the item comprises comparing the received sensor data against a damage threshold to generate the mortality data;

determining mortality data for a component of the item comprises using the received sensor data in a mortality model to generate the mortality data;

the instructions are further operative to generate the mortality model using a neural net trained with historical sensor data and historical mortality data; and generating the mortality model further comprises generating the mortality model using data for the first component and data for the second component.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for determining item mortality based on tracked environmental conditions during transit, the system comprising:
   an outer transport container housing an inner transport container configured to carry a plurality of items in transit;
   a first sensor mounted to the outer transport container and configured to gather first sensor data of a first environmental condition experienced by the plurality of items during transit;
   a second sensor mounted to the inner transport container and configured to gather second sensor data of a second environmental condition experienced by the plurality of items during transit and different from the first environmental condition;
   a processor; and
   a computer-readable medium storing instructions that are operative when executed by the processor to:
     receive the first sensor data from the first sensor;
     receive the second sensor data from the second sensor;
     create a neural net training data set by pairing historical data from the first and second sensor data and historical mortality data associated with each of a plurality of components of an item of the plurality of items;
     train a neural net using the neural net training data;
     generate a tiered mortality model for the item of the plurality of items using the neural net;
     generate mortality data for the item by comparing, using the generated tiered mortality model, the first sensor data to a first damage threshold and the second sensor data to a second damage threshold to determine whether a first component of the plurality of components of the item has degraded or failed and whether a second component of the item in the plurality of items has degraded or failed;
     based at least on the generated mortality data for the item in the plurality of items and disposition rules, determine an expected remaining lifespan for the item in the plurality of items; and
     based at least on the determined expected remaining lifespan for the item in the plurality of items, generate a disposition recommendation for the item in the plurality of items.

2. The system of claim 1 wherein:
receiving at least one of the first sensor data or the second sensor data comprises receiving sensor data from a blockchain; and
the tiered mortality model is a composite model that is tiered according to a probabilistic failure rate of the plurality of components of the item.

3. The system of claim 1 wherein:
the system further comprises a third transport container housing the outer transport container; and
the first sensor data and the second sensor data each comprise measurements from at least one sensor selected from a list comprising: temperature, humidity, air pressure, condensation, salinity, CO2 level, time, shock, and vibration.

4. The system of claim 1 wherein the disposition rules specify exposure conditions or a threshold of the mortality indicating acceptance, acceptance but at a reduced price, deferral to a secondary inventory market, or rejection of the item of the plurality of items.

5. The system of claim 1, further comprising a container that stores the plurality of items during transit, wherein the container includes a lock unit, the lock unit being blockchain-enabled and configured to generate a blockchain entry upon an event involving the lock unit.

6. The system of claim 1 wherein the historical mortality data comprises:
historical failure rates and descriptions, historical repair rates and descriptions, and historical warranty claims.

7. The system of claim 1 wherein the instructions are further operative to:
generate the tiered mortality model to predict a failure rate and an expected remaining lifespan of the first component of the item and a failure rate and an expected remaining lifespan of the second component of the item using the neural net,
wherein the tiered mortality model is based at least on a combination of degradation of the first component of the item and degradation of the second component of the item.

8. The system of claim 7 wherein the generated mortality data is probabilistic and indicates a percentage chance of failure for the item in the plurality of items.

9. The system of claim 7 wherein the instructions are further operative to:
further train the neural net trained with the received first sensor data and the received second sensor data.

10. A method for determining item mortality by a processor based on tracked environmental conditions during transit, the method comprising:
receiving, by the processor, first sensor data from a first sensor for a first environmental condition experienced by a plurality of items during transit, the first sensor mounted to an outer transport container;
receiving, by the processor, second sensor data for a second environmental condition experienced by the plurality of items during transit and different from the first environmental condition, the second sensor mounted to an inner transport container housed within the outer transport container;
creating, by the processor, a neural net training data set by pairing historical data from the first and second sensor data and historical mortality data associated with each of a plurality of components of an item of the plurality of items;
training, by the processor, a neural net using the neural net training data;
generating, by the processor, a tiered mortality model for the item of the plurality of items using the neural net;
generating, by the processor, mortality data for the item by comparing, using the generated tiered mortality model, the first sensor data to a first damage threshold and the second sensor data to a second damage threshold to determine whether a first component of the item in the plurality of items has degraded or failed and whether a second component of the item in the plurality of items has degraded or failed;
based at least on the generated mortality data for the item in the plurality of items and disposition rules, determining, by the processor, an expected remaining lifespan for the item in the plurality of items; and
based at least on the determined expected remaining lifespan for the item in the plurality of items, generating, by the processor, a disposition recommendation for the item in the plurality of items.

11. The method of claim 10, wherein receiving at least one of the first sensor data or the second sensor data further comprises receiving sensor data from a blockchain.

12. The method of claim 10, wherein the first sensor data and the second sensor data each comprise measurements from at least one sensor selected from a list comprising: temperature, humidity, air pressure, condensation, salinity, $CO_2$ level, time, shock, and vibration.

13. The method of claim 10, wherein the disposition rules specify exposure conditions or a threshold of the mortality indicating acceptance, acceptance but at a reduced price, deferral to a secondary inventory market, or rejection of the item of the plurality of items.

14. The method of claim 10, further comprising storing the plurality of items in a container during transit, wherein the container includes a lock unit, the lock unit being blockchain-enabled and configured to generate a blockchain entry upon an event involving the lock unit.

15. The method of claim 10, wherein the historical mortality data comprises:
historical failure rates and descriptions, historical repair rates and descriptions, and historical warranty claims.

16. The method of claim 10, further comprising:
generating the tiered mortality model to predict a failure rate and an expected remaining lifespan of the first component of the item and a failure rate and an expected remaining lifespan of the second component of the item using the neural net,
wherein the tiered mortality model is based at least on a combination of degradation of the first component of the item and degradation of the second component of the item.

17. The method of claim 16, wherein the generated mortality data is probabilistic and indicates a percentage chance of failure for the item in the plurality of items.

18. One or more computer storage devices media having computer-executable instructions stored thereon for determining item mortality based on tracked environmental conditions during transit, which, on execution by a computer, cause the computer to perform operations comprising:
receiving first sensor data from a first sensor for a first environmental condition experienced by a plurality of items during transit, the first sensor mounted to an outer transport container;
receiving second sensor data from a second sensor for a second environmental condition experienced by the plurality of items during transit and different from the first environmental condition, the second sensor mounted to an inner transport container housed within the outer transport container;
creating a neural net training data set by pairing historical data from the first and second sensor data and historical mortality data associated with each of a plurality of components of an item of the plurality of items;
training a neural net using the neural net training data;
generating a tiered mortality model for the item of the plurality of items using the neural net;
generating mortality data for the item by comparing, using the generated tiered mortality model, the first sensor data to a first damage threshold and the second sensor data to a second damage threshold to determine whether a first component of the item in the plurality of items has degraded or failed and whether a second component of the item in the plurality of items has degraded or failed;

based at least on the generated mortality data for the item in the plurality of items and disposition rules, determining an expected remaining lifespan for the item in the plurality of items; and based at least on the determined expected remaining lifespan for the item in the plurality of items, generating a disposition recommendation for the item in the plurality of items.

19. The one or more computer storage media of claim 18, wherein the disposition rules specify exposure conditions or a threshold of the mortality indicating acceptance, acceptance but at a reduced price, deferral to a secondary inventory market, or rejection of the item of the plurality of items.

20. The one or more computer storage media of claim 18, wherein the instructions further cause the computer to perform operations comprising:

generating the tiered mortality model to predict a failure rate and an expected remaining lifespan of the first component of the item and a failure rate and an expected remaining lifespan of the second component of the item using the neural net.

* * * * *

UNITED STATES PATENT AND TRADEMARK OFFICE
CERTIFICATE OF CORRECTION

PATENT NO. : 12,182,755 B2  
APPLICATION NO. : 18/330078  
DATED : June 6, 2023  
INVENTOR(S) : Joseph Jurich, Jr. et al.

Page 1 of 1

It is certified that error appears in the above-identified patent and that said Letters Patent is hereby corrected as shown below:

In the Claims

Column 19, Claim 10, Line 35, after "second sensor data" please insert --from a second sensor--

Column 20, Claim 18, Line 36, please delete "devices"

Signed and Sealed this  
Twenty-seventh Day of May, 2025

Coke Morgan Stewart  
*Acting Director of the United States Patent and Trademark Office*